United States Patent [19]

Reil et al.

[11] 3,980,515

[45] Sept. 14, 1976

[54] SEALING APPARATUS

[75] Inventors: Wilhelm Reil, Bensheim-Auerbach; Jörg Trabitzsch, Seeheim, Bergstrasse, both of Germany

[73] Assignee: Altstadter Verpackungs-Vertriebs GmbH, Pfungstadt am Hintergraben, Germany

[22] Filed: Jan. 23, 1975

[21] Appl. No.: 543,444

[30] Foreign Application Priority Data

Feb. 8, 1974   Germany............................ 2405943

[52] U.S. Cl................................... 156/497; 53/39; 156/203; 156/217; 156/218; 156/466; 156/498; 156/499

[51] Int. Cl.²......................................... B32B 31/00

[58] Field of Search........... 156/461, 465, 466, 497, 156/498, 499, 507, 203, 217, 218, 304, 544, 545, 546, 547, 550; 53/28, 29, 38, 39, 44, 387, 388

[56] References Cited

UNITED STATES PATENTS

| | | | |
|---|---|---|---|
| 3,248,843 | 5/1966 | Winters et al. | 53/39 |
| 3,855,037 | 12/1974 | Imhagen et al. | 156/498 |

*Primary Examiner*—Caleb Weston

[57] ABSTRACT

Apparatus for sealing together portions of material having a sealable plastics coating includes opposed jaws each carrying a guide rail with a slot to receive marginal edges of the material and to spread these edges apart. Hot air is blown onto the spread apart edges to soften the plastics material. The edges are then urged together to form a seam which is accurately defined by the jaws.

7 Claims, 7 Drawing Figures

SEALING APPARATUS

The invention relates to an apparatus for the sealing of plastics-coated webs of carrier material, particularly, but not exclusively, when folded into a tube.

In the packaging industry, the problem frequently arises of connecting two webs of material along a seam. For a long time, the practice has been to coat carrier material such as cardboard, pasteboard or the like, at least on one side with liquid-impervious plastics material, e.g. polyethylene. This plastics material can be softened by heat and then welded. It has long been known to join webs of coated carrier material in this way along sealing seams, by heating.

Sealing can be carried out in various ways. In one proposal, one sealing jaw heated by hot water, steam, combustible gas or hot air, is pressed against an anvil to heat the plastics material through the carrier materials which are to be sealed together and are between the jaw and anvil. However, the heat must be transmitted through the layer of carrier material onto the plastics material until this latter softens and produces a welded joint under the pressure which is applied. The two webs of material are connected to each other along the path defined by the sealing jaw, but it has been found that the transfer of heat through the carrier material not only consumes extra energy and provides for sluggish functioning, but also creates sealed seams which leave much to be desired in terms of precision.

It has therefore also been proposed for welding heat to be applied directly to the place to be sealed, so that the frequently poor heat transference of the carrier material is no longer important. However, when this is done, fresh difficulties arise because the heat-conducting parts ought not to be brought into contact with the plastics material which is to be softened, but nevertheless accurately defined zones need to be heated in order to form a sharply defined sealed seam. In addition, in the case of liquid containers made of pasteboard, cardboard or the like and coated on one side with synthetic plastics material, there is a considerable loading on the sealed seam, and precautions must be taken to construct this seam in sufficiently stable and strong form.

In the field of liquid packages of tubular form, to which the present invention particularly, but not exclusively relates, packages have been proposed made from a web of material, coated on both sides with polyethylene, and folded over to have a tubular or hose-like cross-section and sealed along the free edges by means of a longitudinal sealed seam.

As described in U.S. Pat. No. 2,587,422, a web of carrier material coated on both sides with polyethylene, is passed over a guide plate and converges to form a tube or hose with the free edges overlapping along a relatively broad strip. Hot air is blown into the region of the overlapping strip so that the plastics material on the inside face softens onto the plastics material of the outside face and is made suitable for welding by a subsequent pressure roller. The web of material is advanced continuously in its longitudinal direction.

As described in Swiss Pat. No. 463,087, a longitudinal sealed seam is formed by a flat carrier material, coated on both sides, being guided into tubular form with its free longitudinal edges forming an approximately tangentially-directed wedge-shaped gap, a jet of hot air being directed into the gap. The jet of air is concentrated against the inner narrower part of the gap and provides for softening of the coating. Afterwards, the gap is pressed together and the softened plastics material welds, so that the two free ends of the material are rigidly connected to each other.

The longitudinal seams produced according to these two methods are not adequately strong unless the sealed seam has sharply and cleanly defined straight edges. However, this is only possible if the limits of the sealed seam are the outer free edges of the coated web. In most cases, this results in an undesirably broad sealed seam. Furthermore, with tubes made with the above method, pressure exerted by the liquid acts on the seam in the plane of the web of material. The loading capacity of such seams is not as great as those seams in which pressure acts on the two webs to tend to draw them apart transversely of their surfaces. However, no apparatus or method have become known for making sealed seams which have exactly straight and sharp edges, or are able to utilise the advantage of the seams being such that pressure leads to transverse loading of the seam, with the additional advantage that such seams require carrier material to be coated with plastics on one side only.

According to the present invention there is provided apparatus for sealing together portions of material having a sealable plastics coating, such apparatus including opposed jaws between which the portions may pass and which are resiliently urged together, a slot in a guide rail on each jaw, each slot being positioned to receive the free edge of one portion, the slots being arranged to spread the free edges apart to expose the sealable coating; and a nozzle to blow hot air onto the coating of the spread apart free edges.

The invention aims to provide apparatus with which an accurately formed sealed seam can be produced with hot air, preferably in a short time so that the sealing apparatus can operate at a high rate during intermittent operation and at a high speed in the case of continuous operation.

By virtue of the above mentioned features the sealing apparatus of the invention is capable of joining to each other webs or strips which are coated on only one side with a plastics material, the weldable synthetic plastics coatings on the edges being opposite and in contact with each other. During the sealing process, the contact is guaranteed by the two resiliently oppositely disposed sealing jaws, while the guide rails with the slot-shaped recesses provide for the spreading-apart of the webs which are to be welded together, the spreading-apart exposing the sealable plastics coating opposite the nozzle, which is preferably a slit, and thus opposite the hot air. The adjacent wall parts of the sealing jaws which, when the machine is not in use bear one on the other are, when the webs of material are between them, held apart at distance corresponding to the thickness of the webs of material. The guide rails provided on each sealing jaw, on the side of the nozzle, are preferably set back somewhat from the location of the seal. The slots preferably include an angle of 50° to 90°, more preferably 60° to 80° and in one suitable form 75°. In use, the marginal strips of the web material are threaded into and guided by the slots to be opened at the desired angle of spread. After heating with air, they converge again so that the softened areas are pressed rapidly onto each other to form the sealed seam.

If the apparatus is constructed for intermittent operation, a conveyor means, e.g. with traction rollers, may be so provided that the two webs of material which have to be joined to each other are drawn intermittently through the sealing apparatus. The margins of the web of material are firstly fed into the recesses in the guide rails and as conveyance progresses they are bent over and spread apart, to be heated by hot air. In this condition, those zones of the web which are disposed immediately beside the sealed seam, are between the two opposite end walls of the sealing jaws. The guide rails and the sealing jaws are elongate, their length corresponding to at least one conveyor stroke. As feeding proceeds, the angle of spread diminishes and the heated zones of synthetic plastics material are brought into contact so that the sealed seam is created.

It is an advantage of the invention that except for one movable jaw there need be virtually no moving parts of the machine. Movement of the webs of material, i.e. the theading-in leading to spreading-apart and pressing can be effected by stationary rails. The movable jaw is movable at right-angles to the direction of web conveyance and held for example under spring tension at a distance from the other sealing jaw. However, minimal amounts of travel are involved. Therefore, the machine is subject to virtually no wear and tear, has a long effective life and can be easily constructed. No parts are in contact with the synthetic plastics seam which is softened by the hot air, but nevertheless the welding area, accurately defined by the sealing jaw, lies directly in the zone of the hot air.

The apparatus can also be used for continuous operation, although with intermittent operation, there is the advantage of better cooling of the sealed seam.

The sealing jaw may be longer than the slit-type nozzle, extending downstream thereby to support a wedge-shaped projection extending towards the nozzle. This projection can guide together the spread-apart portion of the web carrying the softened layer of plastics material. Preferably, the slot-shaped recesses in the guide rails co-operate with the wedge-shaped projection on the sealing jaw in such a way that after heating of the plastics coating the angle of spread diminishes rapidly along the sealed seam as conveyance continues, and is finally reduced to zero, an important point being that the softened zones of the plastics material are pressed together to form the sealed seam. The desired pressure of application is produced by the initial tension in the spring of the movable sealing jaw.

In an apparatus for intermittent operation, the length of the sealed seam and, generally the guide rails and sealing jaws are approximately the same as the length of the stroke. A sealing jaw with an above described projection is somewhat longer.

Because the sealed seam is formed by those parts of the synthetic plastics material which are heated by the hot air, it is important to feed hot air into the bottom of the spread edges. This has proved difficult hitherto but the invention reduces these difficulties. The angle of spread is important in this respect and in some cases it has been found that this angle must be 75°, because otherwise turbulence is created by the hot air rendering precise outward definition of the sealed seam difficult, because the transition between softened and non-softened synthetic plastics material is blurred. By reason of the exact adjustment of the angle of spread however, a sealed seam is created which can withstand the loadings which arise.

The sealing jaws may, in cross-section, have the form of a triangle or of a trapezium, the adjacent side walls being constructed to be of a wedge-shape, converging towards the sealed seam, their curve at the sealed seam having a considerable radius of curvature. The strength of the sealed seam depends substantially on how sharply it is defined at the place of maximum loading in a direction at right-angles to the web plane in the seal. The more sharp the boundary the greater the loading capacity of the seam. While at the side adjacent the free edges, the definition of the boundary may be a little blurred due to the flow of hot air, the boundary at the inner side, adjacent the sealing jaw, can be very exactly defined by the considerable radius of curvature on the adjacent walls of the sealing jaws.

It is advantageous for all parts which are brought in contact with the material which is to be sealed, to be cooled. In particular, the sealing jaws are preferably provided with cooling arrangements in the vicinity of the sealed seam. The end faces of the sealing jaws can therefore be at a relatively low temperature at the place of maximum curvature, so that the sharpness of the edge of the sealed seam can be still further improved on this side. The loading capacity of the sealed seam is thus unexpectedly increased, and as synthetic plastics material remains on the cooled parts while the heated parts and the slit-shaped nozzle do not come in contact with the surface of the coated cardboard, the machine will generally not become dirty, which might result in leakages in the seam.

The apparatus of the invention can be used for making packages for liquids, where a coated carrier material web is folded into a tube, sealed and thereafter transverse welded. The sharp boundary of the sealed seam, formed near the sealing jaws, will be on the inside of the tube, with a flange of sealed together marginal edges projecting outwards of the tube. The maximum loading is on the inside, so that advantage is taken of the precise inner edge to the seam.

Preferably the slit-shaped nozzle is formed by two nozzle jaws which enclose a distributor space. A perforated plate may be provided in the distributor plate. These features contribute to an accurately defined blowing-on of hot air, so that the flow conditions can be accurately maintained and the transition between softened and hard parts of the plastics material can be maintained as sharp as possible.

In order that the invention may be more clearly understood, the following description is given, merely by way of example, with reference to the accompanying drawings, in which.

Figure 1:
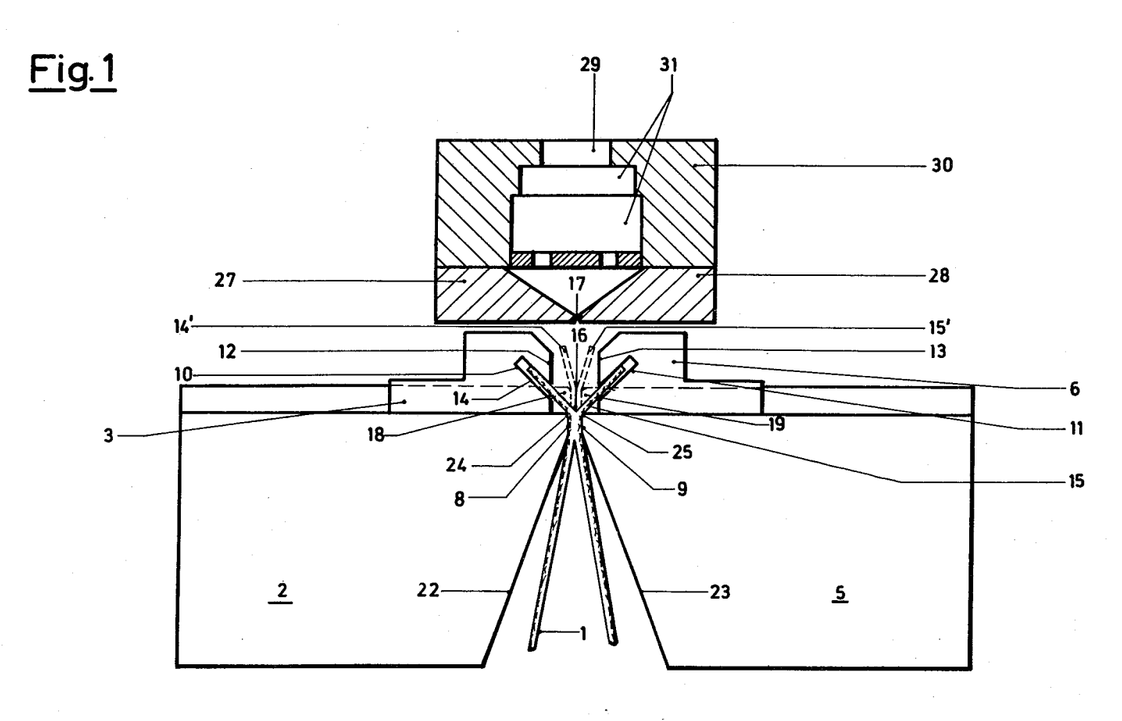
FIG. 1 shows in cross-section a sealing apparatus of the invention which operates discontinuously in order to produce a tube from polyethylene-coated cardboard material.

The following description relates to a preferred form of embodiment of the invention in which a web of cardboard which is to be welded is firstly folded into a tube 1, open on one side, which is threaded into the appropriate parts of the sealing apparatus, provided with a softened seam and then welded at the sealing station. FIG. 1 shows somewhat diagrammatically the substance of the apparatus. The other figures show further details.

Figure 2:
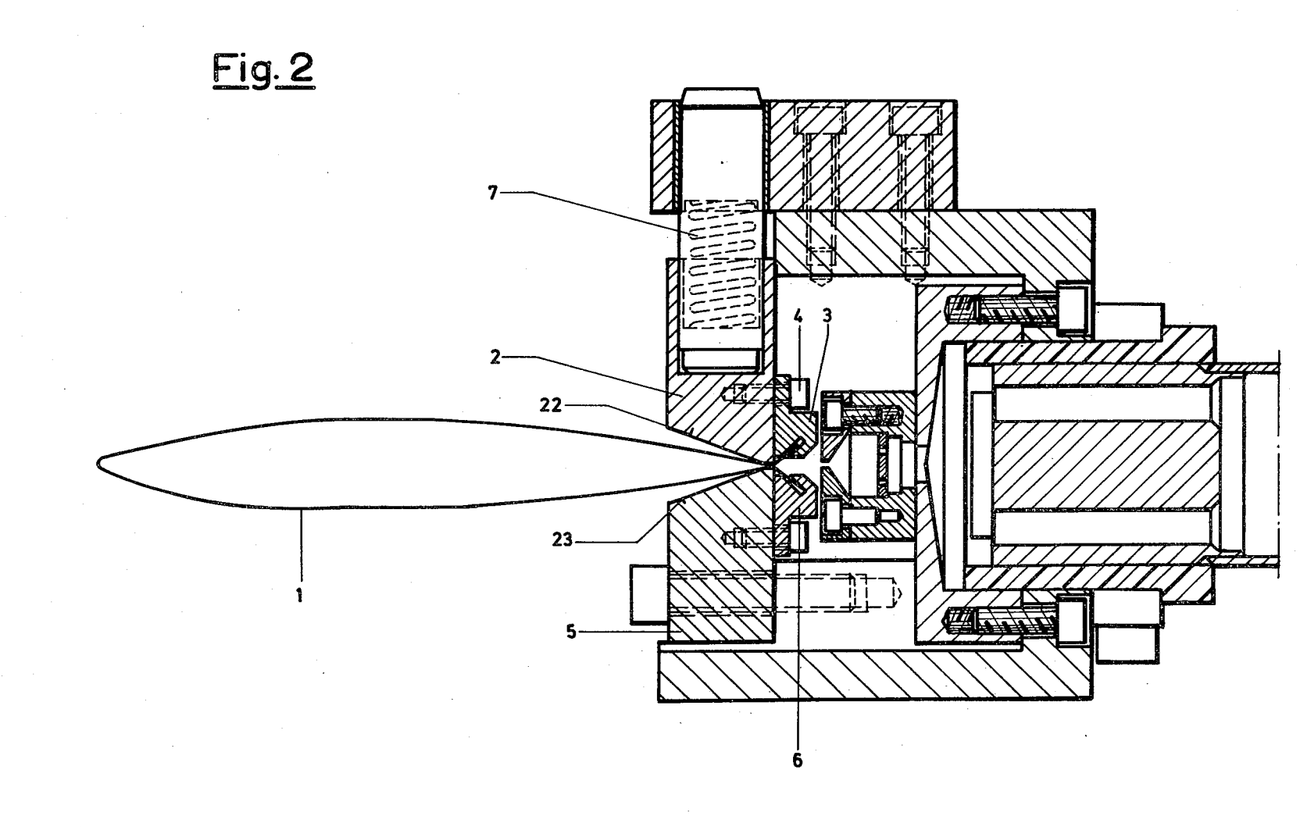
FIG. 2 is an overall view of the apparatus according to FIG. 1 in which, additionally, the resilient mounting of a sealing jaw and a heating apparatus are shown.
Figure 5:
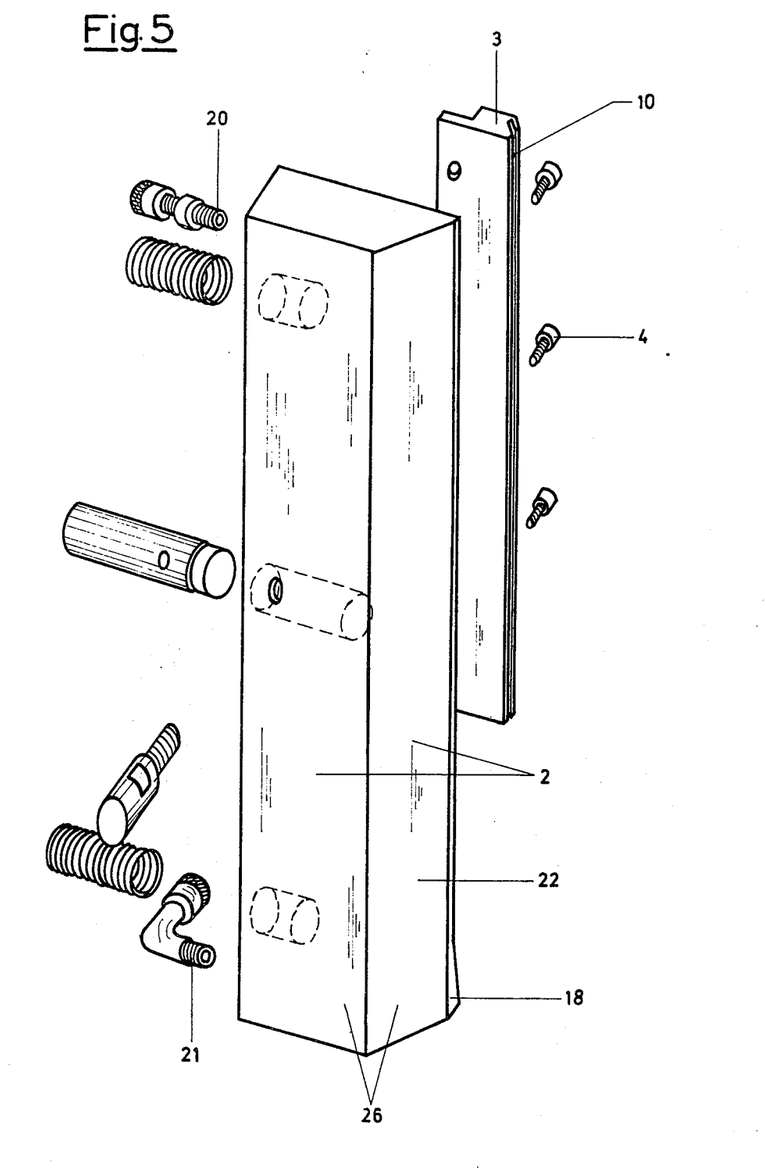
FIG. 5 is a perspective view of a sealing jaw with a guide rail, viewed from the side of the tube.
Figure 6:
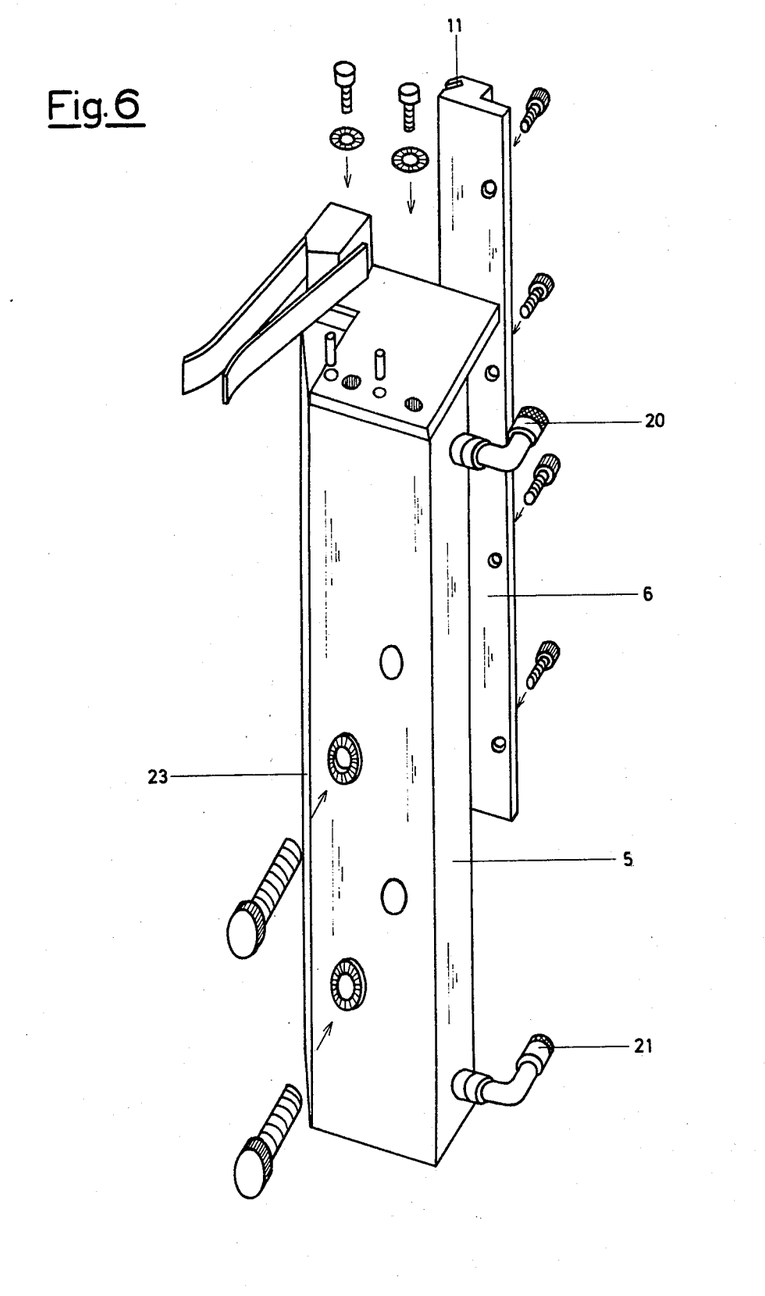
FIG. 6 shows the other sealing jaw with the guide rail of the pair provided.
Figure 7:
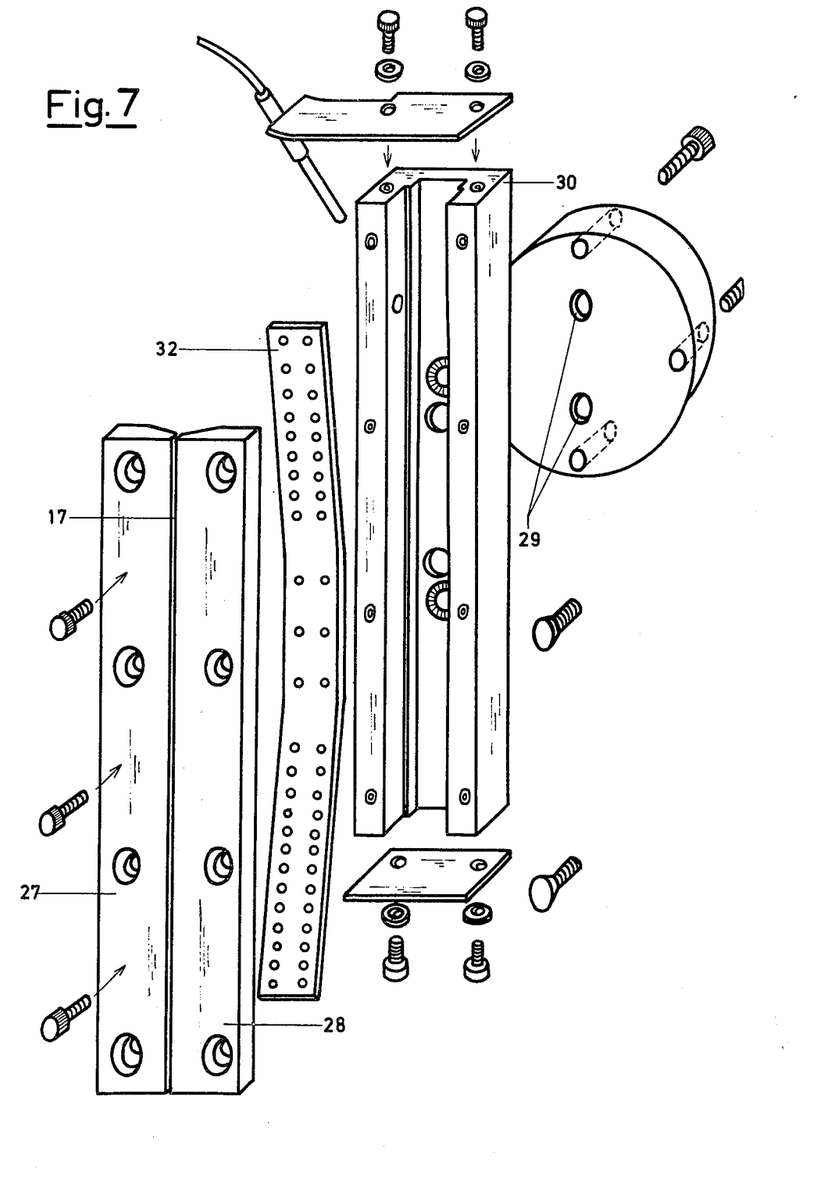
FIG. 7 is an exploded view showing the essential parts for constructing the hot air nozzle device.

A sealing jaw 2 has mounted on it a guide rail 3 secured by screw 4 and is opposite a second sealing jaw 5 with a bolted-on guide rail 6. Jaw 5 is stationary, and jaw 2 is adapted for transverse movement under the initial tension and in the axial direction of a spring 7 (FIG. 2). The jaws have opposed side walls 8 and 9 between which material is passed and are urged together so that their distance apart corresponds to the thickness of the two webs of material of a tube 1 formed by a folding-over process. It will be seen from the drawings that the guide rails 3, 6 are outwardly offset from the plane of symmetry between the walls 8, 9, in the direction of the axis of the spring 7. The guide walls have slot-shaped recesses 10 and 11 with their openings in oppositely disposed side walls 12, 13 of the guide rails 3, 6. The free edges of the web are received in and spread apart by the recesses 10 and 11, and abut in the region of walls 8 and 9, the bottom of the spread-apart zone being designated by reference numeral 16, which represents the place at which the sealed seam is formed when subsequently the marginal parts 14, 15 are folded back into the position 14', 15' shown by broken lines in FIG. 1. The subsequent folding is effected by the wedge-shaped projections 18, 19 on the jaws, as shown in perspective in FIG. 5, which extend towards the front plane of a slit-shaped nozzle 17. In this embodiment, the projections are formed in one piece with the sealing jaws 2, 5.

The slot-shaped recesses 10, 11 include an angle of 75° the angle of spread between the free marginal parts 14, 15 being manifestly somewhat smaller. Nevertheless, for the stream of hot air blown out of the slit-shaped nozzle 17 and onto the bottom 16, good and well defined flow conditions are created in order to form a really sharply defined seam strip.

Particularly good is the sharp demarcation of the seam on the side facing the tube 1, in fact by virtue of the large curvature of the end faces 8 and 9 on the walls of the jaws adjacent to the bottom 16. In the vicinity of the bottom 16 there are cooling means 20, 21, in the form of bores connected to cooling water supply and discharge means. In cross-section, the sealing jaws 2, 5 have the shape of trapezia, and the adjacent walls 8, 9 lead from side walls 22, 23 which diverge in a web shape from each other towards the closed tube. Upper ends of the walls 8 and 9 having the mentioned considerable curvature are designated 24, 25.

Figure 3:
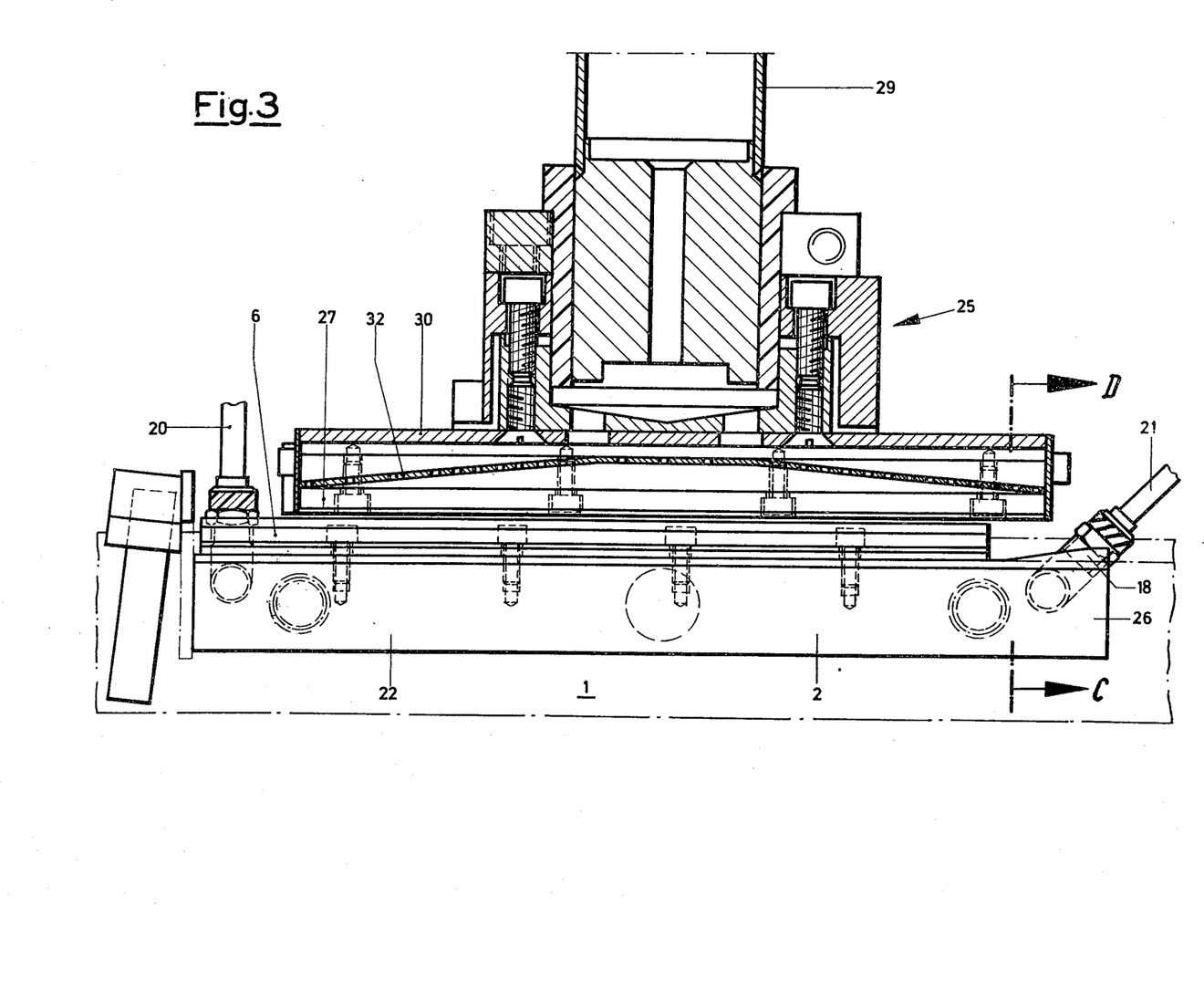
FIG. 3 is a side view of the apparatus of FIG. 2.
Figure 4:
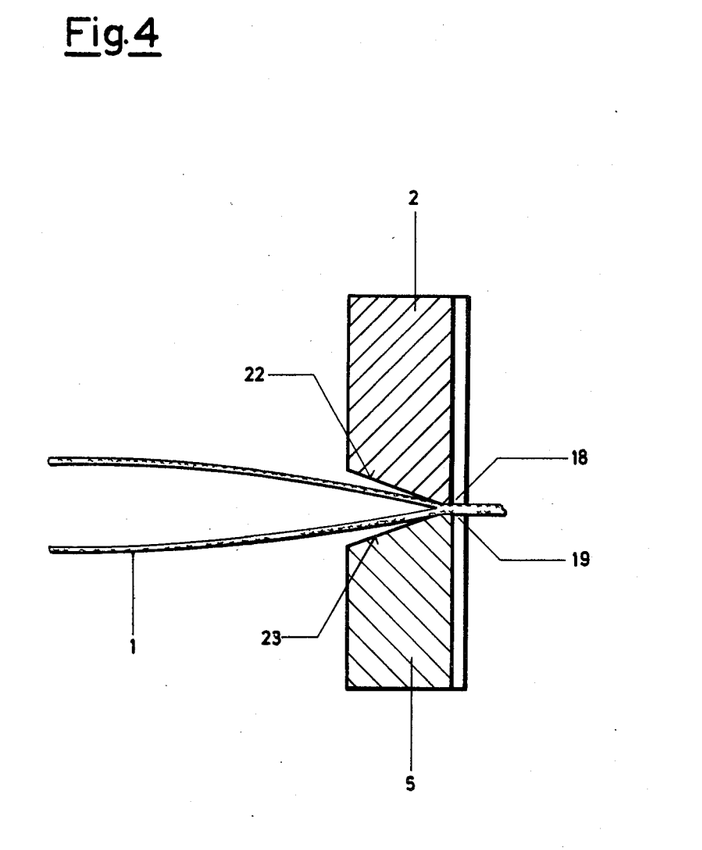
FIG. 4 shows a section on the line C-D in FIG. 3.

It will be seen from FIG. 3 that the sealing jaw 2 (and analogously the sealing jaw 5) is longer than the hot air nozzle device 25 which corresponds in length to the sealed seam 16, and at the lower projecting part 26 the wedge-shaped projection 18 (or 19) is provided. This projection runs towards the slit-type nozzle 17 which in turn is formed by the two nozzle members 27, 28. At the rear of the nozzle 17, in the direction of the hot air supply aperture 29, there is a block 30 in which are provided chambers 31 to give the most even possible distribution of the hot air. At the front, towards the nozzle members 27, 28, the chambers 31 are closed by a perforated plate 32 through which there is a further dispersion of the hot air onto the slit-type nozzle 17.

We claim:

1. Apparatus for sealing together portions of material having a sealable plastics coating, such apparatus comprising in combination opposed jaws between which the portions may pass; means resiliently urging the jaws together, said jaws being held apart at distance corresponding to the thickness of material passing therethrough and said material having free edges; a guide rail on each jaw; a slot in each guide rail and positioned to receive the free edge of one said portion, said slots diverging away from said jaws whereby to spread said free edges apart to expose the sealable coating, said slots forming an angle of 50° to 90°; a slit shaped nozzle means to deliver hot air directly onto the coating at the point of juncture spread of material and means for conveying the spread apart material together and pressing the softened areas to form a sealed seam.

2. Apparatus as claimed in claim 1 wherein said slots include an angle of between 60° and 80°.

3. Apparatus as claimed in claim 1 wherein said slots include an angle of 75°.

4. Apparatus as claimed in claim 1 including guide means extending from said jaws towards said nozzle downstream of said nozzle whereby heated free edges of material passing through said apparatus are urged together.

5. Apparatus as claimed in claim 1 including adjacent curved side walls to said sealing jaws to define a minimum gap between said jaws.

6. Apparatus as claimed in claim 1 including two nozzle members to said nozzle, said members defining a distributor space and a perforated plate in said distributor space.

7. Apparatus as claimed in claim 1 including means to cool said jaws and said guide rails.

* * * * *